(12) United States Patent
Blanco Gabella et al.

(10) Patent No.: US 11,288,021 B2
(45) Date of Patent: Mar. 29, 2022

(54) LIGHTING ELEMENT ADJUSTMENT TOWARDS TARGET PROFILE

(71) Applicant: Hewlett-Packard Development Company, L.P., Houston, TX (US)

(72) Inventors: Jaime Abel Blanco Gabella, Sant Cugat del Valles (ES); David Pou Juan, Sant Cugat del Valles (ES); Gerard Guixe Simon, Sant Cugat del Valles (ES); Francesc Salas Roura, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 874 days.

(21) Appl. No.: 16/074,301

(22) PCT Filed: May 18, 2016

(86) PCT No.: PCT/US2016/033020
§ 371 (c)(1),
(2) Date: Jul. 31, 2018

(87) PCT Pub. No.: WO2017/200538
PCT Pub. Date: Nov. 23, 2017

(65) Prior Publication Data
US 2021/0191669 A1 Jun. 24, 2021

(51) Int. Cl.
*G06F 3/12* (2006.01)
*B41J 11/00* (2006.01)
*G01J 3/50* (2006.01)

(52) U.S. Cl.
CPC ......... *G06F 3/1208* (2013.01); *B41J 11/0095* (2013.01); *G01J 3/505* (2013.01); *G06F 3/1258* (2013.01)

(58) Field of Classification Search
CPC ............................ G06F 3/1208; G06F 3/1258
(Continued)

(56) References Cited

U.S. PATENT DOCUMENTS 6,240,204 B1 * 5/2001 Hidaka ............... H04N 1/6011
382/167
6,351,308 B1 2/2002 Mestha
(Continued)

FOREIGN PATENT DOCUMENTS

| JP | 2005080182 | 3/2005 |
| JP | 2011139213 | 7/2011 |
| KR | 1020100023124 | 3/2010 |

OTHER PUBLICATIONS

X-Rite Inc. i1 Professional Color Management Solutions. Mar. 2011, 8 pages.

*Primary Examiner* — Thomas J Lett
(74) *Attorney, Agent, or Firm* — Fabian VanCott

(57) ABSTRACT

In one example in accordance with the present disclosure a print media lighting system is described. The system includes a multi-colored array of lighting elements to illuminate a print media as the print media passes through an illumination zone of a printing device. The multi-colored array of lighting elements are alterable based on a target lighting profile. The system also includes a control device electrically coupled to the multi-colored array of lighting elements. The control device alters emission characteristics of the lighting elements to adjust an actual lighting profile towards the target lighting profile.

20 Claims, 8 Drawing Sheets

(58) Field of Classification Search
USPC .......................................................... 358/1.13
See application file for complete search history.

(56) References Cited

U.S. PATENT DOCUMENTS

| | | | |
|---|---|---|---|
| 6,384,918 B1 * | 5/2002 | Hubble, III | G01J 3/02 |
| | | | 250/226 |
| 6,621,576 B2 | 9/2003 | Tandon et al. | |
| 6,639,669 B2 | 10/2003 | Hubble et al. | |
| 8,638,288 B2 | 1/2014 | Taylor | |
| 8,729,823 B2 | 5/2014 | Swamy | |
| 9,891,516 B1 * | 2/2018 | DeVaul | H04N 9/3147 |
| 2006/0097978 A1 | 5/2006 | Ng | |
| 2008/0137114 A1 * | 6/2008 | Sanami | G06F 3/1208 |
| | | | 358/1.9 |
| 2008/0204829 A1 | 8/2008 | Harrington | |
| 2009/0109430 A1 | 4/2009 | Stober | |
| 2009/0296085 A1 | 12/2009 | Mestha | |

\* cited by examiner

US 11,288,021 B2

LIGHTING ELEMENT ADJUSTMENT TOWARDS TARGET PROFILE

BACKGROUND

Printing devices have wide application for producing various types of printed media products. For example, residential printing devices provide users with a simple and economical way to produce printed text or images. As another example, large format printing devices allow for a more expansive printing operation. Such large format printing devices facilitate printing onto larger media, such as posters and signs that are larger than a sheet of paper, sometimes for display on the side of buildings, or other large surfaces. Such large format printing devices can also facilitate printing onto media other than paper, media such as vinyl or canvas.

BRIEF DESCRIPTION OF THE DRAWINGS

The accompanying drawings illustrate various examples of the principles described herein and are a part of the specification. The illustrated examples are given merely for illustration, and do not limit the scope of the claims.

Throughout the drawings, identical reference numbers designate similar, but not necessarily identical, elements.

DETAILED DESCRIPTION

Figure 1:
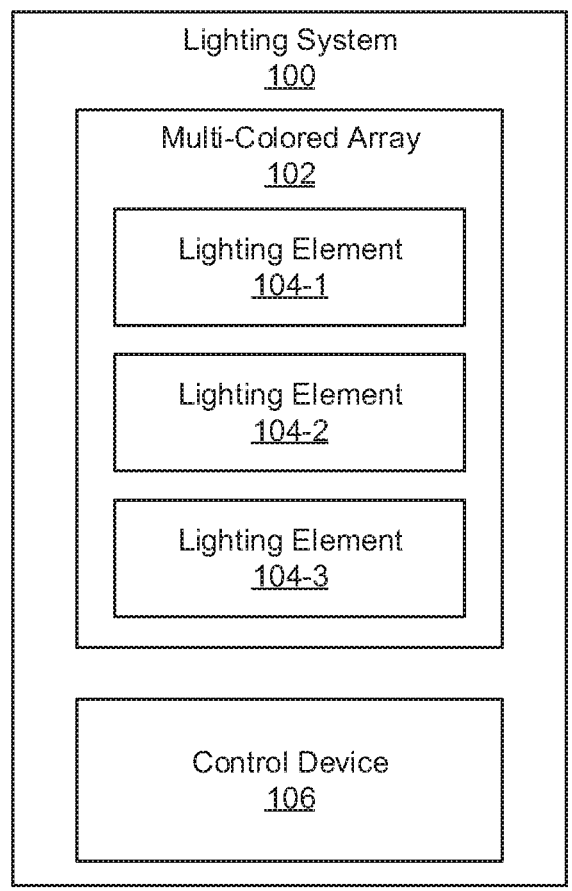
FIG. 1 is a block diagram of a system for lighting element adjustment towards a target profile, according to an example of the principles described herein.

Printing devices, such as large format printing devices, form images or texts on a print media by depositing a printing fluid such as ink onto the surface of the print media. For example, residential printing devices deposit printing fluid onto paper. Some printing devices, referred to as large format printers, can deposit such a printing fluid on print media with larger dimensions. During the printing operation, while a portion of the print media is being printed on, another portion of the print media, which already has printing fluid deposited thereon, may be visually inspected against defects and to ensure print quality and color correctness. In some cases, a lighting system is used to illuminate the print media to aid in this visual inspection process. While such printing devices are useful in depositing printing fluid onto a surface to generate an image or text and to visually inspect the print media, some characteristics of these printing devices impact the quality of the image or text produced.

For example, the lighting conditions in a room where the printing occurs may be different from the lighting conditions under which the completed project will ultimately be displayed. Accordingly, a coloring of the printed images or texts may be different when viewed in the printing environment as compared to the display environment. The use of a standard illumination system does not solve this problem as it doesn't address how the product will be viewed under the different lighting profiles under which the project will be displayed. In other words, the lighting environment where the product is produced may impair the visual inspection operation as the image and/or text is visually inspected under conditions that differ from display conditions. For example, while the quality and color correctness of a print job may appear to be satisfactory when viewed in the printing environment, i.e., in a printing room, the quality and color correctness may be less than satisfactory when considered under the lighting conditions of the print job in its display setting, i.e., outdoors on a building, or when illuminated by different light types than those used in the printing environment.

Accordingly, the present specification describes a system wherein different lighting profiles can be emulated; a lighting profile referring to a set of lighting conditions. For example, one lighting profile may correspond to outdoor lighting conditions. According to the present specification and the systems described herein, the print job can be inspected under different lighting conditions to verify that the print job will look as it is intended under the prescribed display lighting situation. Continuing the example above, if a print job is to be displayed outdoors, the system can emulate outdoor light so as to verify the quality, identify defects, and ensure color correctness of the print job under outdoor lighting conditions, notwithstanding the printing is occurring in a different environment, i.e., a printing environment.

Specifically, the present specification describes a print media lighting system. The lighting system includes a multi-colored array of lighting elements to illuminate a print media as the print media passes through an illumination zone of a printing device. The multi-colored array of lighting elements are alterable based on a target lighting profile. The system also includes a control device electrically coupled to the multi-colored array of lighting elements. The control device alters the emission characteristics of the lighting elements to adjust an actual lighting profile towards the target lighting profile.

The present specification also describes a method for adjusting lighting elements towards a target profile. According to the method, beams of light that correspond to a target lighting profile are emitted from a multi-colored array of lighting elements in a printing device. A difference between 1) the lighting profile that is actually projected onto the print media by the multi-colored array of lighting elements and 2) the target lighting profile is determined by a light detector. Emission characteristics of the lighting elements are altered such that the actual lighting profile adjust towards the target lighting profile.

The present specification further describes a computer system. The computer system includes a processor and a machine-readable storage medium coupled to the processor. An instruction set is stored in the machine-readable storage medium and is to be executed by the processor. The instruction set includes 1) instructions to compare data representing an actual lighting profile projected on a print media by a multi-colored array of lighting elements against data representing a target lighting profile and 2) instructions to alter emission characteristics of the multi-colored array of lighting elements such that the actual lighting profile adjust towards the target lighting profile.

Using such a lighting system 1) allows identification of defects by illuminating the print job via different lighting conditions 2) allows identification of potential printing defects before completion of the print job; and 3) allows the print job to be viewed under different lighting conditions to ensure quality and color correctness. However, it is contemplated that the devices disclosed herein may provide useful in addressing other matters and deficiencies in a number of technical areas. Therefore the systems and methods disclosed herein should not be construed as addressing any of the particular matters.

As used in the present specification and in the appended claims, the term "illumination zone" refers to an area within a printing device that is illuminated following the deposition of a printing fluid onto a print media.

Further, as used in the present specification and in the appended claims, the term "lighting profile" refers to different lighting scenarios that may be emulated and used to illuminate the print media. A lighting profile may be defined by the temperature of the light. For example, a first lighting profile may emulate a standard incandescent lamp, which standard incandescent lamp has a color temperature of around 2,400 Kelvin (K). In another example, a second lighting profile may emulate an outdoor direct sunlight lighting condition, the second lighting profile having a color temperature of around 5,500-6,000 K. In other examples, a lighting profile may emulate a sunny day outdoor lighting scenario or a shady outdoor lighting scenario. The lighting profiles may also be defined by an intensity and wavelength of received light. Different light colors such as orange, purple, pink, yellow, etc. may be emulated by different quantities of color channels emitted by the array.

Still further, as used in the present specification and in the appended claims, the term "actual lighting profile" refers to a lighting profile that is actually projected onto a print media and may include the light emitted from the lighting elements combined with environmental light. By comparison, a "target lighting profile" refers to a lighting profile that is selected by a user and that is defined based on color temperature and/or intensity and wavelength of various beams of light.

Still further, as used in the present specification and in the appended claims, the term "emission characteristics" refers to properties of the lighting elements that could be varied. Example of emission characteristics include an intensity, and wavelength of emitted light. Another emission characteristics that could be varied is the dispersion, or randomness of the light beams. Yet another example of a characteristics that can be varied is the amount of light, i.e., on a scale of 0-255 for example.

Further, as used in the present specification and in the appended claims, the term "a number of" or similar language is meant to be understood broadly as any positive number comprising 1 to infinity.

In the following description, for purposes of explanation, numerous specific details are set forth in order to provide a thorough understanding of the present systems and methods. However, in other examples, the present apparatus, systems, and methods may be practiced without these specific details. Reference in the specification to "an example" or similar language means that a particular feature, structure, or characteristic described in connection with that example is included as described, but may not be included in other examples.

Turning now to the figures, FIG. 1 is a block diagram of a print media lighting system (100) for adjusting lighting elements (104) towards a target lighting profile, according to an example of the principles described herein. The lighting system (100) may be implemented in a printing device such as a large format printer that prints on media such as vinyl, latex, or paper. The large format printer may facilitate printing on wide media, so as to allow printing large images and text. Accordingly, the lighting system (100) may span the printing width of the large format printer.

The lighting system (100) includes a multi-colored array (102) of lighting elements (104-1, 104-2, 104-3). As used in the present specification and in the appended claims, the presence of the indicator "-*" references a particular instance of an element. For example, a first lighting element is indicated as (104-1). By comparison, the absence of such an indicator references a generic instance of the element. For example, a generic lighting element may be indicated by (104). While FIG. 1 depicts three lighting elements (104), any number of lighting elements (104) could be used in accordance with the principles described herein. For example, more lighting elements (104) could be used to increase a bandwidth and/or to reproduce a lighting profile more accurately.

The lighting elements (104) in the array (102) illuminate a print media as the print media passes through an illumination zone. The illumination zone may be an area that is defined as coming after a printing zone where a printing fluid is deposited onto the print media. A lighting element (104) may be any component that illuminates an area and whose emission characteristics can be modified. For example, the lighting elements (104) may be light emitting diodes (LEDs) that are controlled by the control device.

As described above, the array (102) may be multi-colored, that is different color lighting elements (104) may be used. For example, the array (102) may include red lighting elements, green lighting elements, and blue lighting elements. A combination of similarly colored lighting elements is referred to as a channel. For example, the array (102) may include a red channel, a green channel, and blue channel, each channel including a number of lighting elements of the corresponding color. The combination of these lighting elements (104) can emulate different lighting profiles. The lighting elements (104) may be ordered in any pattern.

The lighting elements (104) may be alterable to emulate even more lighting profiles. For example, the lighting elements (104) may be alterable to change at least one of an intensity, wavelength, and dispersion to generate different lighting profiles. By modulating the relative intensities of the red, green, and blue color channels, any color in the visible spectra can be emulated as a lighting profile.

As described above, a lighting profile may define a different lighting situation and may be defined by a color temperature. For example a daylight lighting profile may have one color temperature, and a fluorescent lamp lighting profile may have a different color temperature. These lighting profiles may be useful in replicating the display conditions of the printed product.

The lighting profiles may also be defined by an intensity and wavelength of different light beams. For example, lighting profiles can correspond to different shades, or hues of different colors such as orange, purple, pink, and yellow. As a specific example, a lighting profile may be defined by a curve on an x-y plot, the x-axis indicating different wavelengths of light and the y-axis indicating an intensity of the different wavelengths.

Such color-specific lighting profiles assist in detecting print defects such as bronzing. A color lighting profile may be generated based on the amount of light emitted by each color channel. For example, in an RGB color space, each channel may be defined on a scale of 0-255 that indicates how much of that particular channel is being emitted. Accordingly, the lighting elements (104) may be adjusted so as to achieve a color temperatures or color values that define the different lighting profiles emulated by the array (102). In other words, each color of the visible spectra can be split up into color channels, such as red, green, and blue.

The lighting system (100) also includes a control device (106) electrically coupled to the multi-colored array (102) of lighting elements (104). The control device (106) adjusts the emission characteristics of the lighting elements (104) to emulate the different lighting profiles. For example, if a 'warmer' light is desired, a red color channel may be intensified to generate the warmer light. By comparison, if a 'cooler' light is desired, a blue color channel may be intensified to generate a cooler light. In generating lighting profiles that represent different colors, the value of different color channels may be changed, for example on the 0-255 scale previously discussed in a RGB color space. While specific reference is made to the RGB color space, other color spaces may be used as well including the LAB color space among others. In this fashion, the control device (106) adjusts the emission characteristics of the various lighting elements (104) so as to emulate the different lighting profiles.

In this fashion, the system (100) is alterable so that a printed-on media can be illuminated according to different lighting profiles. In so doing greater flexibility is provided in determining if the printed-on media has the desired properties, specifically given a particular lighting profile under which the printed-on media will be displayed. Doing so also allows for detection of certain printing defects by illuminating the print media with different specific colors generated by the array (102). By emulating different lighting profiles, the lighting system (100) described herein allows for the emulation of different lighting environments that allow a user to see the printed area in the actual lighting conditions under which the print job will be displayed (reproducing different color temperatures, or relative color levels) and provides an additional tool for detecting print defects.

Figure 2:
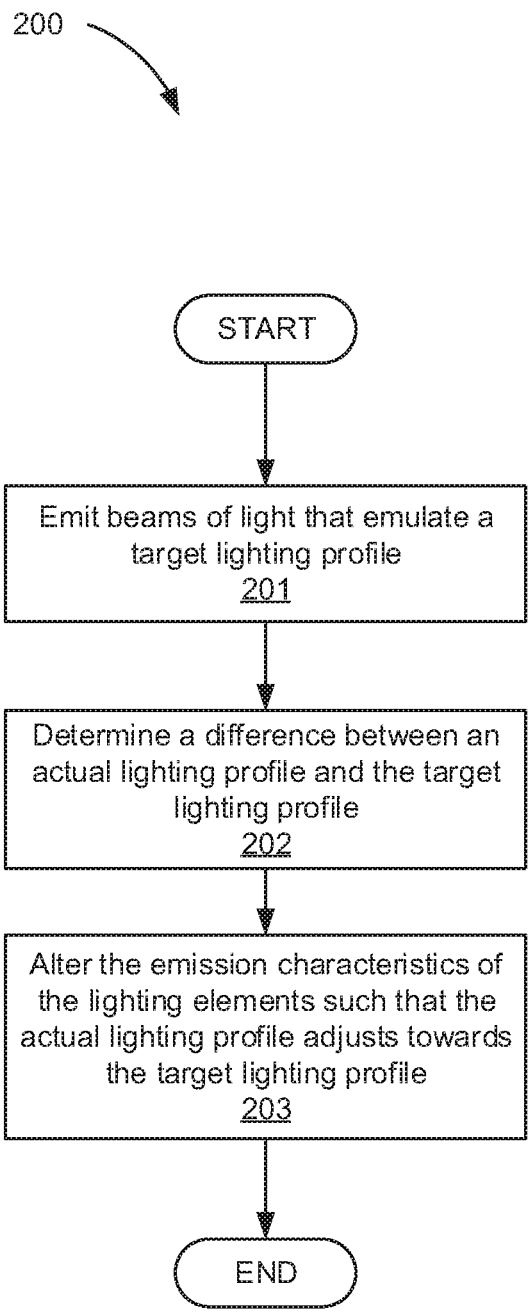
FIG. 2 is a flowchart of a method for lighting element adjustment towards a target profile, according to an example of the principles described herein.

FIG. 2 is a flowchart of a method (200) for lighting element adjustment towards a target profile, according to an example of the principles described herein. As a general note, the method (200), or portions of the method (200) may be implemented in the form of executable instructions stored on at least one machine-readable storage medium of at least one of the devices and executed by at least one processor of the device. Alternatively or in addition, the method (200) may be implemented in the form of electronic circuitry (e.g., hardware). While FIG. 2 depicts operations occurring in a particular order, a number of the operations of the method (200) may be executed concurrently or in a different order than shown in FIG. 2. In some examples, the method (200) may include more or less operations than are shown in FIG. 2. In some examples, a number of the operations of the method (200) may, at certain times, be ongoing and/or may repeat.

According to the method (200), beams of light are emitted (block 201), which beams of light, when considered collectively, correspond to a target lighting profile. In some examples, the target lighting profile may be a predetermined lighting profile. For example, via a display on a user interface device, a user may select from a list of predetermined lighting profiles. Examples of predetermined lighting profiles include incandescent lighting, fluorescent lighting, outdoor daylight clear sky, outdoor daylight overcast, outdoor nightlight, or other profiles such as a warm lighting profile, a cool lighting profile, and a standard lighting profile. While specific reference is made to specific lighting profiles, any such predetermined lighting profile may be used in accordance with the systems and methods described herein.

In another example, the target lighting profile may be a customized lighting profile. For example, from an initial starting point, or from a predetermined lighting profile, a user may adjust the different color channels, i.e., select to increase or decrease the intensity of certain lighting elements, to generate a customized, user-defined lighting profile. Once a target lighting profile is selected, the lighting elements (FIG. 1, 104) are activated to emit beams of light in accordance with the target lighting profile, be it a predetermined lighting profile or a customized user-defined lighting profile.

The selection of a target lighting profile may occur at or before the time of printing. For example, during printing a user may select a particular lighting profile to be emulated and through which the print job is illuminated. In this example, throughout the printing operation, a user may select multiple lighting profiles to illuminate a project.

In another example, a user may select beforehand the target lighting profile used to illuminate the print job. Also, as above, the user may select multiple target lighting profiles. For example, via the user interface device, a user may input a sequence of different lighting profiles, either predefined or customized, that are to be generated and used to illuminate the lighting profile. For example, a user may select to have an outdoor daylight lighting profile generated followed by an outdoor night lighting profile. Such a sequence may advance automatically or via input from the user.

Due to a number of conditions, there may be a difference between actual lighting profile projected on the print media and the target lighting profile. For example, room lighting in which the printing device is used may impact the actual lighting profile that is projected onto the print media. More specifically, fluorescent lights in a room where the printing device is located may introduce variation between the actual lighting profile and the target lighting profile. Other examples of conditions which could introduce variation between an actual lighting profile and a target lighting profile include debris on the array (FIG. 1, 102) and an age of the lighting elements (FIG. 1, 104) of the array (FIG. 1, 102). Accordingly, a light detector of the control device (FIG. 1, 106) can determine (block 202) a difference between the actual lighting profile and the target lighting profile. This can be done by analyzing the characteristics of received light, i.e., intensity, wavelength, and/or dispersion, and comparing those characteristics to those expected to generate the target lighting profile.

As a specific example, the lighting system (FIG. 1, 100) may be preconfigured to define different lighting profiles and the amount of each color channel emitted to generate that lighting profile. However, the amount of light projected onto a print media may change due to environmental conditions, age of the lighting elements (FIG. 1, 104), or debris on the array (FIG. 1, 102). Accordingly, a light detector can receive beams of light that are to be projected onto the print media, which received light includes both the light emitted by the lighting elements (FIG. 1, 104) and ambient light. These beams of light are then analyzed and data reflective of the beams determined. For example, a light detector can sample the lighting profile every 2 or 5 nanometers and record the value of an intensity of the received light for various wavelengths. A processor can then transform these values into relative levels of red, green and blue channels. As a specific numeric example, it could be determined that a green channel has a relative value of 180 on the 0-255 scale. In this example, a particular target lighting profile may be defined as having the green channel at a level of 190. Accordingly, the processor can determine that the projected green channel is lower than what is expected for the predetermined selected target lighting profile.

The control device (FIG. 1, 106) then alters (block 203) the emission characteristics of the lighting elements (FIG. 1, 104) such that the actual lighting profile adjusts towards the target lighting profile. That is, the emission characteristics such as the relative value of the different color channels may be adjusted such that the intensity, wavelength, and dispersion of the actual lighting profile approaches the intensity, wavelength, and dispersion as expected to produce the target lighting profile.

As an example, a user may select an outdoor clear sunny lighting profile having a color temperature of around 5,500-6,000 K. Due to the fluorescent lights in the room where printing occurs, debris on the lighting elements (FIG. 1, 104), or the age of the lighting elements (FIG. 1, 104), the actual lighting profile as seen by the print media may have a color temperature that is different than the 5,500-6,000 K used to define the outdoor clear sunny lighting profile. If left unchecked, this variation could lead to undesirable results as the final printed product will not have been examined under the actual outdoor clear sunny lighting profile, thus leading to the potential situation where the finished product does not look as desired in its display setting.

Accordingly, the control device (FIG. 1, 106) may alter (block 203) the emission of the different color channels to bring the actual lighting profile consistent with the target lighting profile.

Accordingly, using the system (FIG. 1, 100) described herein, a user may replicate the viewing conditions of the final print job to ensure a desired output, i.e., color correctness, quality, etc. For example, previous systems may rely on a simple binary, i.e., on-or-off, white illumination system. However, such a system may not be able to replicate different lighting profiles. Also, such a system may not be able to be calibrated based on environmental conditions such as room lighting or other environmental conditions.

Figure 3:
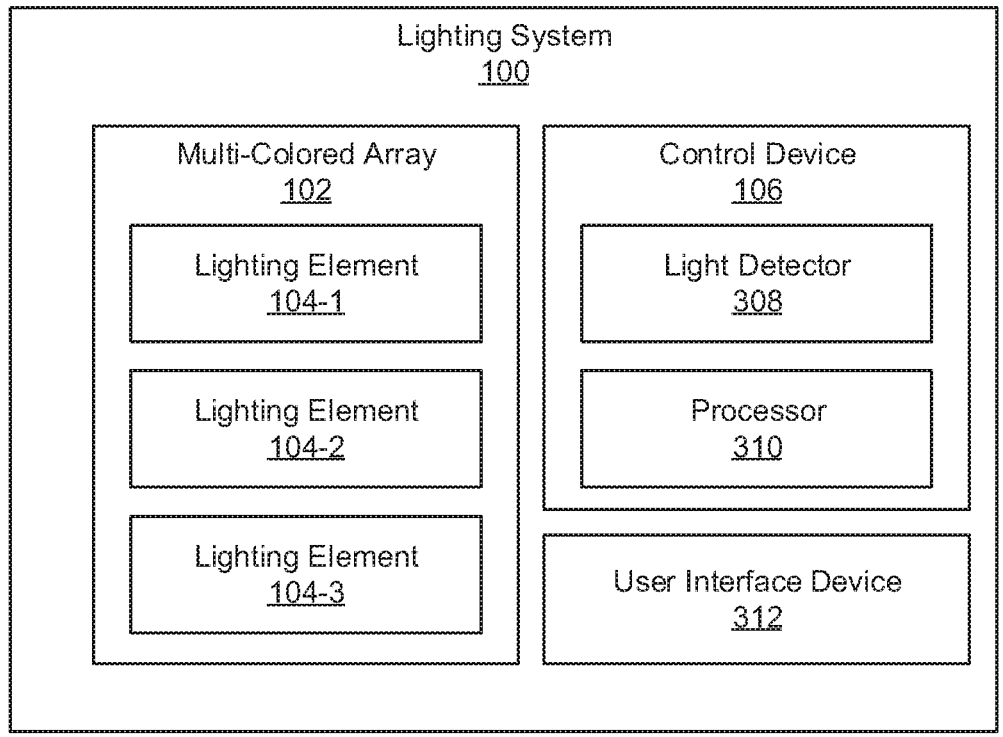
FIG. 3 is a block diagram of a system for lighting element adjustment towards a target profile, according to another example of the principles described herein.

FIG. 3 is a block diagram of a lighting system (100) for lighting element (104) adjustment towards a target profile, according to another example of the principles described herein. As with the system depicted in FIG. 1, the lighting system (100) includes a multi-colored array (102) of lighting elements (104). The system (100) also includes a control device (106) to aid in the adjustment and calibration of the multi-colored array (102).

Specifically, the control device (106) includes a light detector (308). The light detector (308) receives the beams of light that would be seen by a print media, which include ambient light and light emitted from the lighting elements (104) and analyzes such light beams. In so doing, the light detector (308) can measure the actual lighting profile, which actual lighting profile is a lighting profile as seen by the print media. Accordingly, the light detector (308) is any component that can receive and analyze light. For example, the light detector (308) may be a spectrophotometer. A spectrophotometer measures the amount of light transmitted from a light source, i.e., the lighting elements (104). A spectrophotometer may measure the intensity of a light beam as a function of its color. The spectrophotometer may be a single beam spectrophotometer or a double beam spectrophotometer. While specific mention is made of a spectrophotometer, in other examples, other light detectors may be used such as a colorimeter.

The system (100) also includes a processor (310) to adjust emission characteristics of the lighting elements (104) to more accurately emulate the target lighting profile. For example, the information collected by the light detector (308) is passed to the processor (310) which adjusts the lighting elements (104) until the actual lighting profile seen by the print media is the same as, or within a threshold difference, to what is expected by the specific calibrated characteristics of the system (100) as it relates to the target lighting profile.

The processor (310) may include the hardware architecture to retrieve executable code from a data storage device and execute the executable code. The executable code may, when executed by the processor (310), cause the processor (310) to implement at least the functionality of receiving actual lighting profile data values and adjusting the lighting elements (104) emission characteristics to more closely match those expected for a target lighting profile. In the course of executing code, the processor (310) may receive input from and provide output to a number of the remaining hardware units.

The system (100) also includes a user interface device (312). The user interface device (312) may be any device, such as a liquid crystal display (LCD) that presents information to a user. From this user interface device (312), a target lighting profile may be selected. Also from this user interface device (312), a customized user-defined lighting profile may be created. Accordingly, the system (100) may allow for selection of particular lighting profiles and then calibration of the system (100) such that actual lighting conditions match what was selected by the user. In some examples, the calibration of the lighting elements (104) may be a closed loop operation. That is, in this example a user may select from a number of predefined lighting profiles such as fluorescent light, sunlight, or cloudy light. In this example, the received light beams based on the selection are gathered by the light detector (308) and via an adjustment by the processor (310), the array (102) can be calibrated such that actual lighting profile matches the target lighting profile.

In another example, the calibration of the lighting elements (104) may be an open loop operation. In this example, there may be a number of predefined lighting profiles, or a user may start from any other starting point. The user interface (312) may display a number of parameters, such as intensity of the different colored lighting elements. A user can then adjust those parameters as desired to achieve a desired lighting profile. In this case, a user has the ability to see the print job under desired lighting conditions and also allows for fine-tune control over the lighting profile to provide a customizable lighting profile selected by the user. Additional examples of the interface (312) and selection of various lighting profiles or emission characteristics is provided below in connection with FIGS. 6A and 6B.

Figure 4:
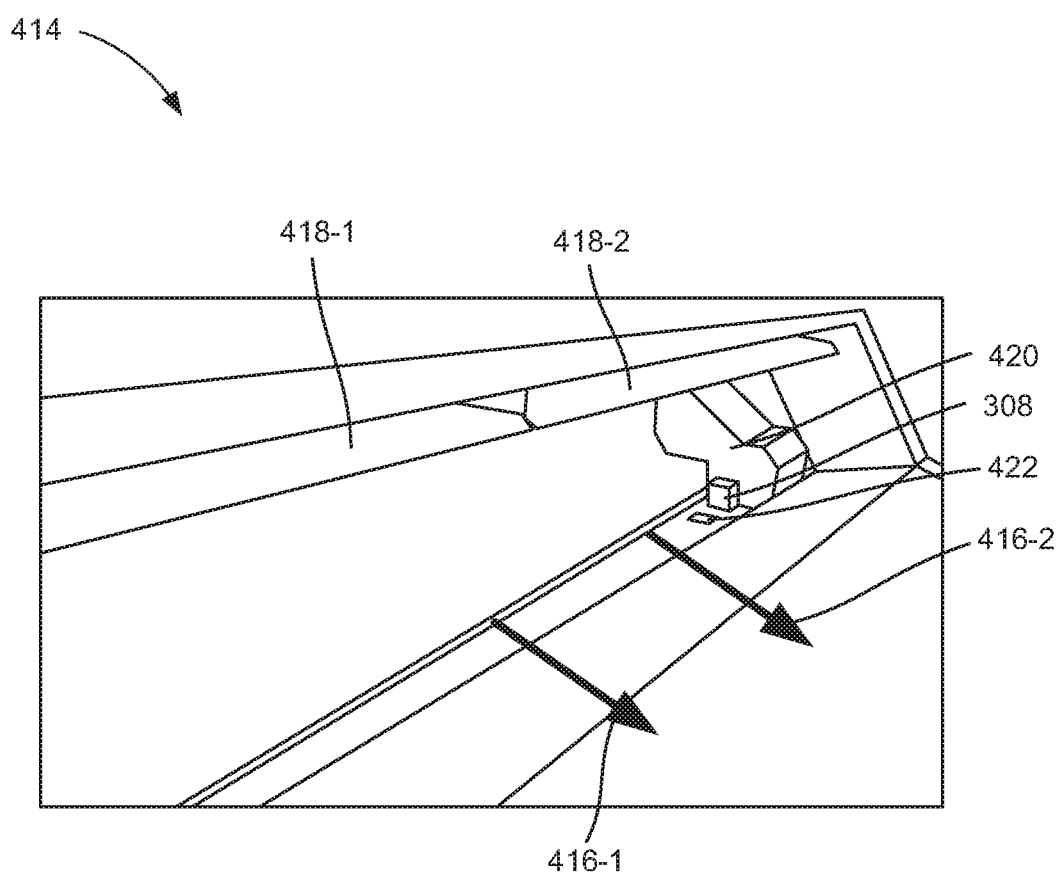
FIG. 4 is an isometric view of a portion of a printing device incorporating a system lighting element adjustment towards a target profile, according to an example of the principles described herein.

FIG. 4 is an isometric view of a portion of a printing device (414) incorporating a lighting system (FIG. 1, 100)

for lighting element (FIG. 1, 104) adjustment towards a target profile, according to an example of the principles described herein. A printing device (414) may deposit printing fluid on a print media, which print media, after having been printed on, exits the printing device (414) as indicated by the arrows (416-1, 416-2). Following printing, the print media enters an illumination zone defined as an area that is illuminated by the array (FIG. 1, 102) of lighting elements (FIG. 1, 104). The array (FIG. 1, 102) of lighting elements (FIG. 1, 104) may be housed in any number of lighting fixtures (418-1, 418-2).

As described above, the system (FIG. 1, 100) also includes a control device (FIG. 1, 106) which includes a light detector (308). As described above, the light detector (308) receives light indicative of light projected onto a print media and analyzes the light beams. In some examples, the light detector (308) may be installed on a carriage (420). During calibration, the carriage (420) may move perpendicular to the direction of travel of the print media such that the light detector (308) is in a position to receive a portion of light emitted from the lighting elements (FIG. 1, 104) in the light fixtures (418) which is reflected off the reflective surface (422). An example of the collection of light is provided below in connection with FIG. 5. In this fashion, the actual light profile can be determined and, via the processor (FIG. 3, 310), can be compared to the target lighting profile and the lighting elements (FIG. 1, 104) adjusted accordingly.

Figure 5A:
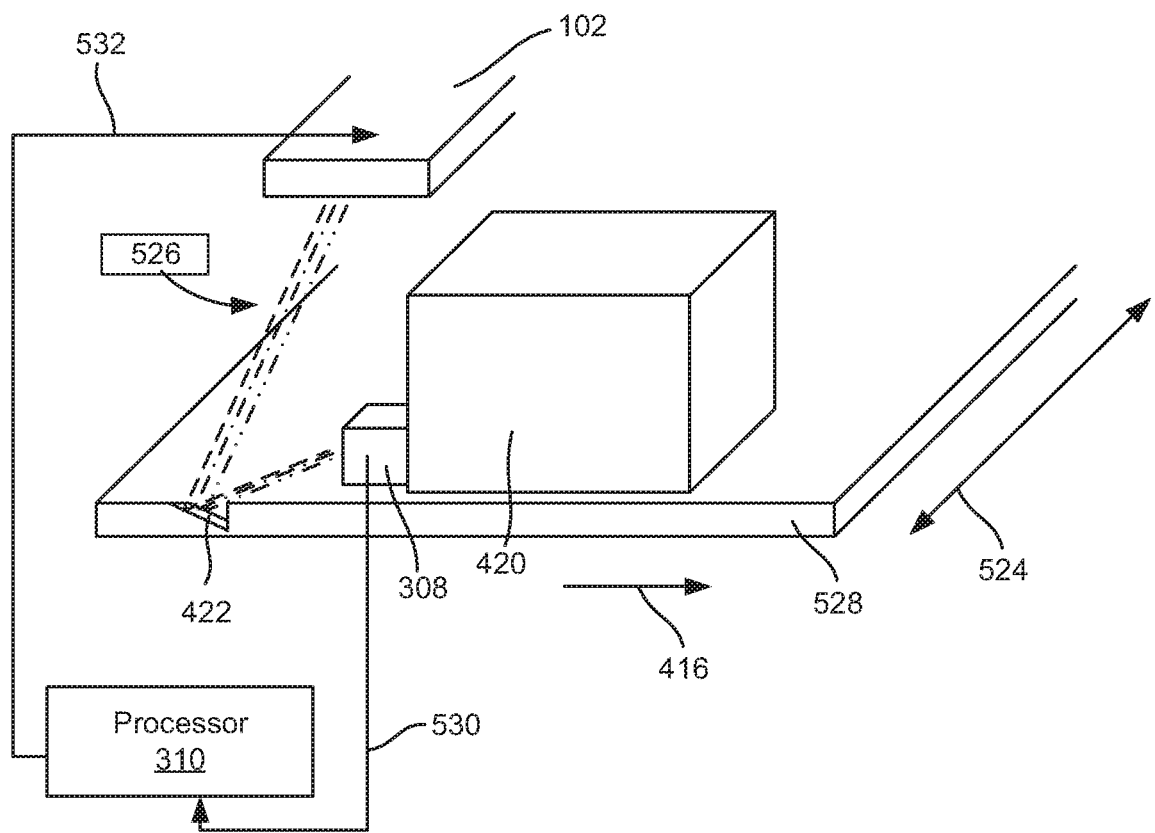
FIGS. 5A and 5B are views of a portion of the system for lighting element adjustment towards a target profile as installed in a device, according to an example of the principles described herein.
Figure 5B:
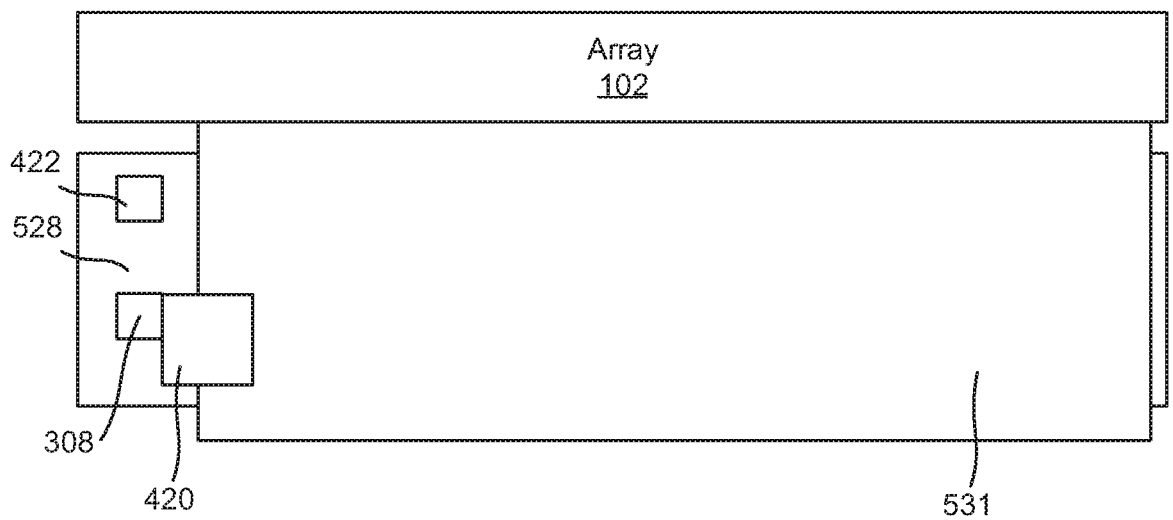

FIGS. 5A and 5B are views of a portion of the lighting system (FIG. 1, 100) for lighting element (FIG. 1, 104) adjustment towards a target profile as installed in a device, according to an example of the principles described herein. Specifically, FIG. 5A is an isometric view of a portion of the print media lighting system (FIG. 1, 100) as installed in a device, according to an example of the principles described herein. As described above, in some examples, the light detector (308) is coupled to a carriage (420) that moves perpendicular to a discharge path of the print media. In FIG. 5A, the movement of the carriage (420) and corresponding light detector (308) is indicated by the arrow (524) and the discharge path of the print media is indicated by the arrow (416).

During a calibration operation, which in some examples occurs at a different point in time from a printing operation, the carriage (420) moves into a position such that light (526), represented in FIG. 5A as various dashed lines, emitted from the lighting elements (FIG. 1, 104) of the array (102) is reflected off the reflective surface (422) and into the light detector (308). As noted, in some examples, the reflective surface (422), may be disposed in a platen (528) of the device in which the system (FIG. 1, 100) is inserted. During printing, the platen (528) serves as a support for exiting media. The reflective surface (422) may be angled such that the light can be directed into the light detector (308).

In some examples, the reflective surface (422) maybe positioned under a discharge path of the paper. However, in some examples, as depicted in FIG. 5B, the reflective surface (422) may be disposed to the side of the print media (531) such that the printing device may print at the same time as calibrating the lighting elements (FIG. 1, 104) in the array (102).

Using the reflective surface (422) as described herein allows the light detector (308) to both calibrate the lighting elements (FIG. 1, 104) in the array (102) as well as perform other functions, such as analyzing the color of the printing fluid that is deposited on the print media, which may pass between the platen (528) and the carriage (420). In some examples, the light detector (308) may be a different detector than one that analyzes the color of printing fluid that is deposited on the print media. In this example, the distinct light detector could be placed on the platen and alleviate the use of a reflective surface (422).

As described above, the emitted light (526) may have certain characteristics that are used to attempt to emulate a target lighting profile. However, due to environmental conditions, debris on the lighting elements (FIG. 1, 104), age, or other conditions, the projected light may not exactly match the target lighting profile. Accordingly, an actual lighting profile may be determined via the light detector (308). The collected data (530) may then be sent to the processor (310). The processor (310), using this data may determine an adjustment value for the different color channels within the array (102) that will align the actual lighting profile with the target lighting profile. The processor (310) can then send a control signal (532) to the lighting elements (FIG. 1, 104) of the array (102) to compensate for these environmental conditions, debris, age, or other conditions such that the actual lighting profile more closely matches the target lighting profile.

Such a control system allows for the conditions associated with a target lighting profile to be accurately reproduced by the array (102) of lighting elements (FIG. 1, 104) such that an accurate reproduction of the print job as it will be seen as a final product can be replicated. Doing so ensures that desired quality and color characteristics are implemented in the final printed product.

Figure 6A:
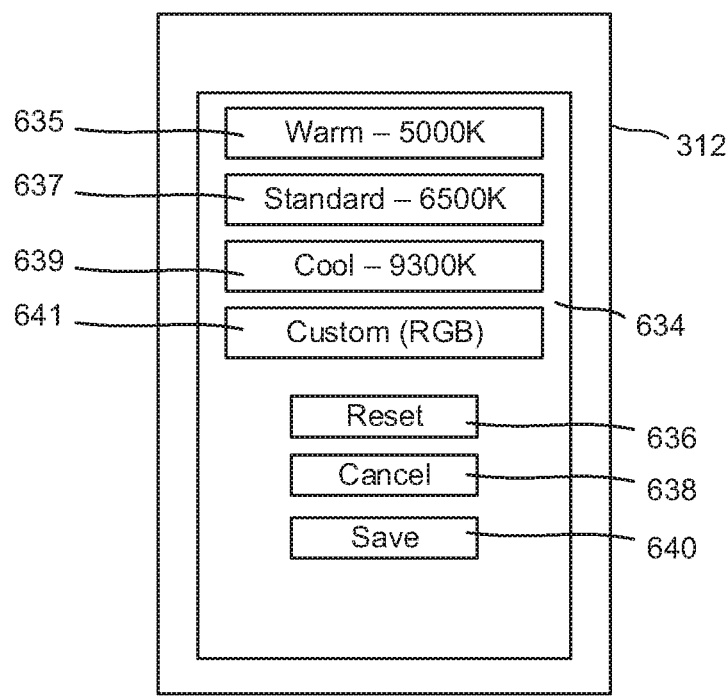
FIGS. 6A and 6B are diagrams of a user display presented on a user interface, according to examples of the principles described herein.
Figure 6B:
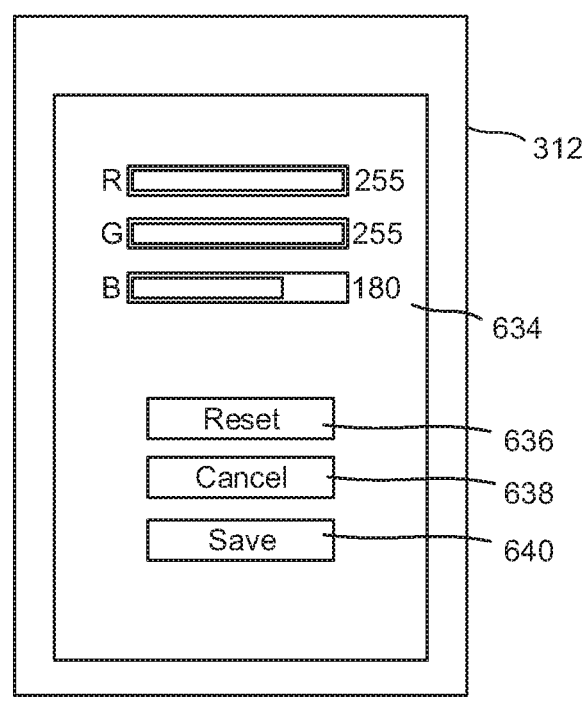

FIGS. 6A and 6B are diagrams of a user display (634) presented on a user interface device (312), according to examples of the principles described herein. As described above, the user interface device (312) may be any device that displays information to a user. Such a device (312) may be a computer screen, a laptop screen, and a screen disposed on the printing device in which the system (FIG. 1, 100) is implemented among other user interface devices (312). FIG. 6A is an example of a display (634) that allows a user to select from a number of predefined lighting profiles. Specifically, in this particular example, a user may select a "Warm" lighting profile (635), a "Standard" lighting profile (637), or a "Cool" lighting profile (639). In this example, the user may also select a "Custom" lighting profile (641), where a user could use an interface screen as depicted in FIG. 6B to generate a customized lighting profile. While FIG. 6A depicts specific lighting profiles depicted in a particular fashion, the display (634) may include other components to facilitate selection and/or generation of a specific lighting profile and may display other lighting profiles.

The display (634) may also present other functionality to the user. For example, a user can elect to reset the selection operation by, for example, selecting a reset button (636). Similarly the user can elect to cancel a selection by selecting a cancel button (638). Still further, a user can elect to save a particular lighting profile by selecting the save button (640). While FIG. 6A makes specific reference to specific buttons and functionality, the display (634) may present additional functionality via other user interface components.

The display (634) depicted in FIG. 6B may allow a user to generate a customized lighting profile. For example, via sliders, buttons, drop down menus or other user interface components, a user may adjust the intensity, or other emission characteristics of the different color channels of the multi-colored array (FIG. 1, 102). For example, as depicted in FIG. 6B, the user has elected to reduce the emission of the blue color channel so as to present a particular lighting profile. While specific reference is made to adjusting the values of the blue color channel, the other color channels may similarly be adjusted.

Figure 7:
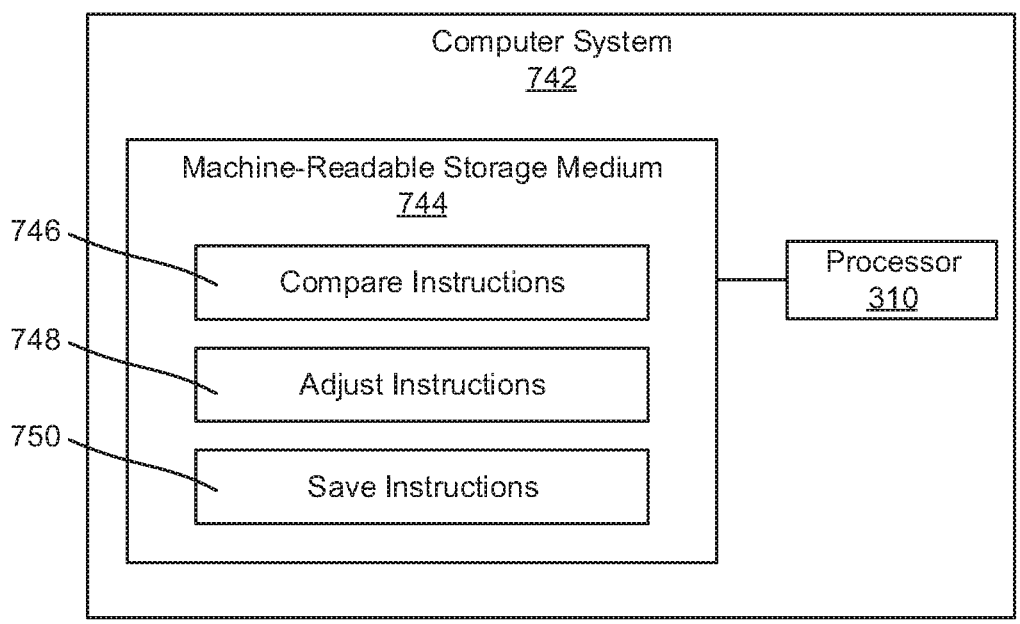
FIG. 7 is a diagram of a computer system to calibrate a lighting system for lighting element adjustment towards a target profile, according to another example of the principles described herein.

FIG. 7 is a diagram of a computer system (742) to calibrate a print media lighting system (FIG. 1, 100) for lighting element (FIG. 1, 104) adjustment towards a target profile, according to another example of the principles described herein. The computer system (742) includes a processor (310) and machine-readable storage medium (744) coupled to the processor (310). Although the following descriptions refer to a single processor (310) and a single machine-readable storage medium (744), the descriptions may also apply to a computer system (742) with multiple processors and multiple machine-readable storage mediums. In such examples, the instructions may be distributed (e.g., stored) across multiple machine-readable storage mediums and the instructions may be distributed (e.g., executed by) across multiple processors.

The processor (310) may include at least one processor and other resources used to process programmed instructions. For example, the processor (310) may be a number of central processing units (CPUs), microprocessors, and/or other hardware devices suitable for retrieval and execution of instructions stored in machine-readable storage medium (744). In the computer system (742) depicted in FIG. 7, the processor (310) may fetch, decode, and execute instructions (746, 748, 750) to operate and control a multi-colored array (FIG. 1, 102) of lighting elements (FIG. 1, 104). As an alternative or in addition to retrieving and executing instructions, the processor (310) may include a number of electronic circuits comprising a number of electronic components for performing the functionality of a number of the instructions in the machine-readable storage medium (744). With respect to the executable instruction representations (e.g., boxes) described and shown herein, it should be understood that part or all of the executable instructions and/or electronic circuits included within one box may, in alternate examples, be included in a different box shown in the figures or in a different box not shown.

The machine-readable storage medium (744) represent generally any memory capable of storing data such as programmed instructions or data structures used by the computer system (742). The machine-readable storage medium (744) includes a machine-readable storage medium that contains machine readable program code to cause tasks to be executed by the processor (310). The machine-readable storage medium (744) may be tangible and/or non-transitory storage medium. The machine-readable storage medium (744) may be any appropriate storage medium that is not a transmission storage medium. For example, the machine-readable storage medium (744) may be any electronic, magnetic, optical, or other physical storage device that stores executable instructions. Thus, machine-readable storage medium (744) may be, for example, Random Access Memory (RAM), an Electrically-Erasable Programmable Read-Only Memory (EEPROM), a storage drive, an optical disc, and the like. The machine-readable storage medium (744) may be disposed within the computer system (742), as shown in FIG. 7. In this situation, the executable instructions may be "installed" on the computer system (742). Alternatively, the machine-readable storage medium (744) may be a portable, external or remote storage medium, for example, that allows the computer system (742) to download the instructions from the portable/external/remote storage medium. In this situation, the executable instructions may be part of an "installation package". As described herein, the machine-readable storage medium (744) may be encoded with executable instructions for dual-power reception.

Referring to FIG. 7, compare instructions (746), when executed by a processor (310), may cause the computer system (742) to compare data representative of an actual lighting profile as emitted by a multi-colored array (FIG. 1, 102) of lighting elements (FIG. 1, 104) against a target lighting profile. Adjust instructions (748), when executed by a processor (310), may cause the computer system (742) to adjust emission characteristics of the multi-colored array (FIG. 1, 102) of lighting elements (FIG. 1, 104) such that the actual lighting profile adjusts towards the target lighting profile. Such adjustment may include adjusting an intensity of light emitted from lighting elements (FIG. 1, 104) from a certain color channel. In some examples, the machine-readable storage medium (744) includes save instructions (750) that, when executed by a processor (310) may cause the computer system (742) to save a user-defined lighting profile.

In some examples, the processor (310) and machine-readable storage medium (744) are located within the same physical component, such as a server, or a network component. The machine-readable storage medium (744) may be part of the physical component's main memory, caches, registers, non-volatile memory, or elsewhere in the physical component's memory hierarchy. Alternatively, the machine-readable storage medium (744) may be in communication with the processor (310) over a network. Thus, the computer system (742) may be implemented on a user device, on a server, on a collection of servers, or combinations thereof.

The computer system (742) of FIG. 7 may be part of a general purpose computer. However, in alternative examples, the computer system (742) is part of an application specific integrated circuit.

Figure 8:
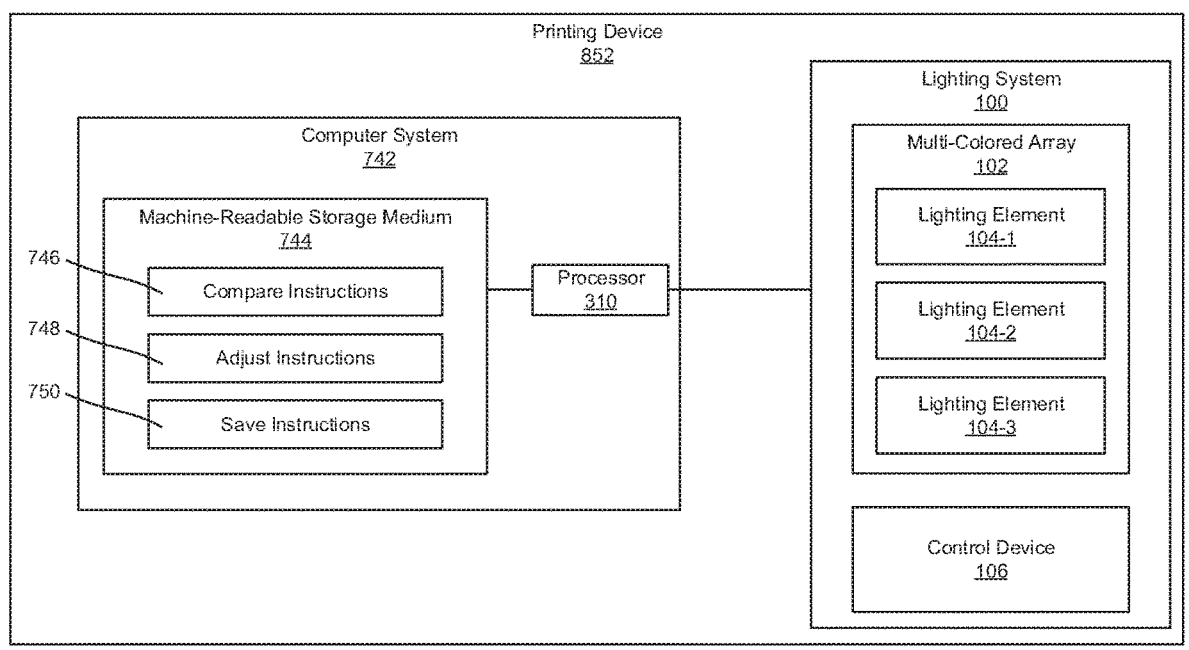
FIG. 8 is a diagram of a printing system including a lighting system and a computer system, according to one example of the principles described herein.

FIG. 8 is a diagram of a printing device (852) including a lighting system (100) and a computer system (742), according to one example of the principles described herein. As described above, in some examples, the lighting system (100) may be placed in a printing device (852) that deposits a printing fluid onto a print media. In this example, the printing device (852) also includes the computer system (742) which as described above includes instructions to compare data representative of an actual lighting profile as emitted by a multi-colored array (FIG. 1, 102) of lighting elements (FIG. 1, 104) against a target lighting profile and instructions to adjust emission characteristics of the multi-colored array (102) of lighting elements (104) such that the actual lighting profile adjusts towards the target lighting profile. In this example, the processor (310) of the computer system (742) may send a control signal that alters the emission characteristics of the lighting elements so as to more closely match the actual lighting profile to the target lighting profile.

Using such a lighting system 1) allows identification of defects by illuminating the print job via different lighting conditions 2) allows identification of potential printing defects before completion of the print job; and 3) allows the print job to be viewed under different lighting conditions to ensure quality and color correctness. However, it is contemplated that the devices disclosed herein may provide useful in addressing other matters and deficiencies in a number of technical areas. Therefore the systems and methods disclosed herein should not be construed as addressing any of the particular matters.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor (FIG. 3, 305) of the 3D printing system (FIG. 3, 300; FIG. 5, 500) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The preceding description has been presented to illustrate and describe examples of the principles described. This description is not intended to be exhaustive or to limit these principles to any precise form disclosed. Many modifications and variations are possible in light of the above teaching.

What is claimed is:

1. A print media lighting system comprising:
   a multi-colored array of lighting elements to illuminate a print media as the print media passes through an illumination zone of a printing device, wherein the multi-colored array of lighting elements are alterable based on a target lighting profile; and
   a control device electrically coupled to the multi-colored array of lighting elements to alter emission characteristics of the lighting elements to adjust an actual lighting profile towards the target lighting profile.

2. The lighting system of claim 1, wherein the multi-colored array of lighting elements comprises at least one red lighting element, at least one green lighting element, and at least one blue lighting element.

3. The lighting system of claim 1, wherein the control device comprises:
   a light detector to receive and analyze emitted light from the multi-colored array of lighting elements and ambient light; and
   a processor to:
   compare data representing emission characteristics corresponding to the actual lighting profile to data representing emission characteristics corresponding to the target lighting profile; and
   alter emission characteristics of the lighting elements to emulate the target lighting profile.

4. The lighting system of claim 3, wherein the light detector is a spectrophotometer.

5. The lighting system of claim 3, wherein the control device further comprises a reflective surface to reflect light emitted from the multi-colored array of light elements into the light detector.

6. The lighting system of claim 5, wherein the reflective surface is formed in a platen of the printing device.

7. The lighting system of claim 3, further comprising a carriage on which the light detector is disposed.

8. The lighting system of claim 1, further comprising a user interface device to allow generation of a customized lighting profile.

9. The lighting system of claim 1, further comprising a user interface device to allow selection of a predetermined lighting profile.

10. The lighting system of claim 1, wherein altering the emission characteristics of the lighting elements to emulate the different lighting profiles comprises altering the emission characteristics to emulate at least one of a different color temperature and a different color.

11. The lighting system of claim 1, wherein the system is disposed in the printing device.

12. The lighting system of claim 1, wherein the target lighting profile is selected from the group consisting of:
    outdoor daylight clear sky;
    outdoor daylight overcast; and
    outdoor night light.

13. The lighting system of claim 1, wherein the control device is to sequentially alter emission characteristics to emulate different target lighting profiles in sequence.

14. A method for adjusting lighting elements towards a target lighting profile comprising:
    emitting, from a multi-colored array of lighting elements in a printing device, beams of light that correspond to the target lighting profile to illuminate a print media as it is being printed on, wherein the target lighting profile projects the lighting conditions under which the print media is to be displayed;
    determining, via a light detector, a difference between an actual lighting profile emitted by the multi-colored array of lighting elements and the target lighting profile; and
    altering emission characteristics of the lighting elements such that the actual lighting profile adjusts towards the target lighting profile.

15. The method of claim 14, further comprising presenting a user display to allow selection of the target lighting profile from a plurality of available lighting profiles.

16. The method of claim 14, further comprising presenting a user display to allow adjustment of color channels of the multi-colored array.

17. The method of claim 14, further comprising presenting a user display to allow the input of a sequence of different lighting profiles to be emitted.

18. The method of claim 14, wherein determining the difference between the actual lighting profile and the target lighting profile and altering characteristics of the lighting elements occur during printing.

19. A computer system comprising:
    a processor;
    a machine-readable storage medium coupled to the processor; and
    an instruction set stored in the machine-readable storage medium to be executed by the processor, wherein the instruction set comprises:
    instructions to compare an actual lighting profile as emitted by a multi-colored array of lighting elements against a target lighting profile; and
    instructions to account for differences resulting from ambient light by altering emission characteristics of the multi-colored array of lighting elements such that the actual lighting profile adjust towards the target lighting profile.

20. The system of claim 19, wherein the instruction set comprises instructions to save a user-defined lighting profile.

* * * * *